(12) United States Patent
Bellinger (10) Patent No.: US 6,839,619 B2
(45) Date of Patent: Jan. 4, 2005

(54) SYSTEM FOR CONTROLLING A FUELING GOVERNOR FOR AN INTERNAL COMBUSTION ENGINE

(75) Inventor: Steven M. Bellinger, Columbus, IN (US)

(73) Assignee: Cummins, Inc., Columbus, IN (US)

( * ) Notice: Subject to any disclaimer, the term of this patent is extended or adjusted under 35 U.S.C. 154(b) by 184 days.

(21) Appl. No.: 10/050,080

(22) Filed: Jan. 15, 2002

(65) Prior Publication Data

US 2003/0135320 A1 Jul. 17, 2003

(51) Int. Cl.$^7$ .............................................. G06F 19/00
(52) U.S. Cl. ....................... 701/103; 701/110; 123/330
(58) Field of Search .................................. 701/101–104, 701/51, 54, 65, 110, 105; 123/330, 332, 337, 376, 352; 477/111

(56) References Cited

U.S. PATENT DOCUMENTS

| | | | |
|---|---|---|---|
| 4,671,235 A * | 6/1987 | Hosaka | 123/352 |
| 5,105,331 A | 4/1992 | Dykstra et al. | |
| 5,406,483 A | 4/1995 | Kallis et al. | |
| 5,549,096 A * | 8/1996 | Swenson et al. | 123/564 |
| 5,553,589 A * | 9/1996 | Middleton et al. | 123/352 |
| 5,605,130 A | 2/1997 | Dykstra et al. | |
| 5,868,214 A | 2/1999 | Workman | |
| 6,042,505 A * | 3/2000 | Bellinger | 477/111 |
| 6,078,859 A | 6/2000 | Jastrzebski et al. | |
| 6,089,207 A | 7/2000 | Goode et al. | |
| 6,092,504 A | 7/2000 | Barnes et al. | |
| 6,167,979 B1 | 1/2001 | Taylor et al. | |
| 6,196,188 B1 | 3/2001 | Janic et al. | |
| 6,202,629 B1 | 3/2001 | Zhu et al. | |
| 6,289,873 B1 * | 9/2001 | Dunsworth | 123/352 |
| 6,387,011 B1 * | 5/2002 | Bellinger | 477/111 |
| 6,436,005 B1 * | 8/2002 | Bellinger | 477/111 |
| 6,546,329 B2 * | 4/2003 | Bellinger | 701/115 |

\* cited by examiner

Primary Examiner—John T. Kwon
(74) Attorney, Agent, or Firm—Barnes & Thornburg (57) ABSTRACT

A system for controlling a fueling governor for an internal combustion engine includes a fueling governor responsive to a throttle command value and current engine speed to produce a fueling signal for supplying fuel to the engine. The governor defines a droop value corresponding to an engine speed difference between a no-load fueling condition and a full-load fueling condition for any constant throttle command value, and also has a gain value associated therewith defining a responsiveness of the governor to changes in the throttle command value to effectuate corresponding changes in engine speed via control of the fueling signal. In one embodiment a control computer is operable to modify the droop value as a function of one or more engine and/or vehicle operating conditions. Alternatively or additionally, the control computer may be operable to modify the gain value as a function of one or more engine and/or vehicle operating conditions.

21 Claims, 5 Drawing Sheets

SYSTEM FOR CONTROLLING A FUELING GOVERNOR FOR AN INTERNAL COMBUSTION ENGINE

FIELD OF THE INVENTION

The present invention relates generally to systems for controlling a fueling governor for an internal combustion engine, and more specifically to such systems operable to control either of a governor droop value and at least one governor gain value.

BACKGROUND OF THE INVENTION

Electronic fueling governors for use with internal combustion engines are known and widely used in the automotive and diesel engine industries. In the heavy-duty diesel engine industry in particular, such governors typically include a reference speed logic circuit responsive to an accelerator pedal, hand throttle, cruise control or other signal indicative of a fueling request to produce a corresponding reference engine speed value. The reference engine speed value and a measured engine speed value, indicative of the actual rotational speed of the engine, are provided to a summation node where an error value indicative of a difference therebetween results. The error value is supplied to a controller that is configured to produce one or more fueling signals in a manner that minimizes the error value.

An electronic governor of the foregoing type has a number of operating parameters associated therewith that define the operational behavior of the governor. For example, the reference speed logic circuit defines a relationship between the operator requested fueling signal (i.e., accelerator pedal signal, hand throttle signal, cruise control fueling request signal or the like) and the reference engine speed value, wherein such an operator requested fueling signal will be referred to hereinafter as a "throttle signal." In any case, this relationship between the throttle signal and the reference engine speed value typically includes a so-called "droop" value, wherein droop, in the context of the present invention, will be described with reference to FIG. 1.

Figure 1:
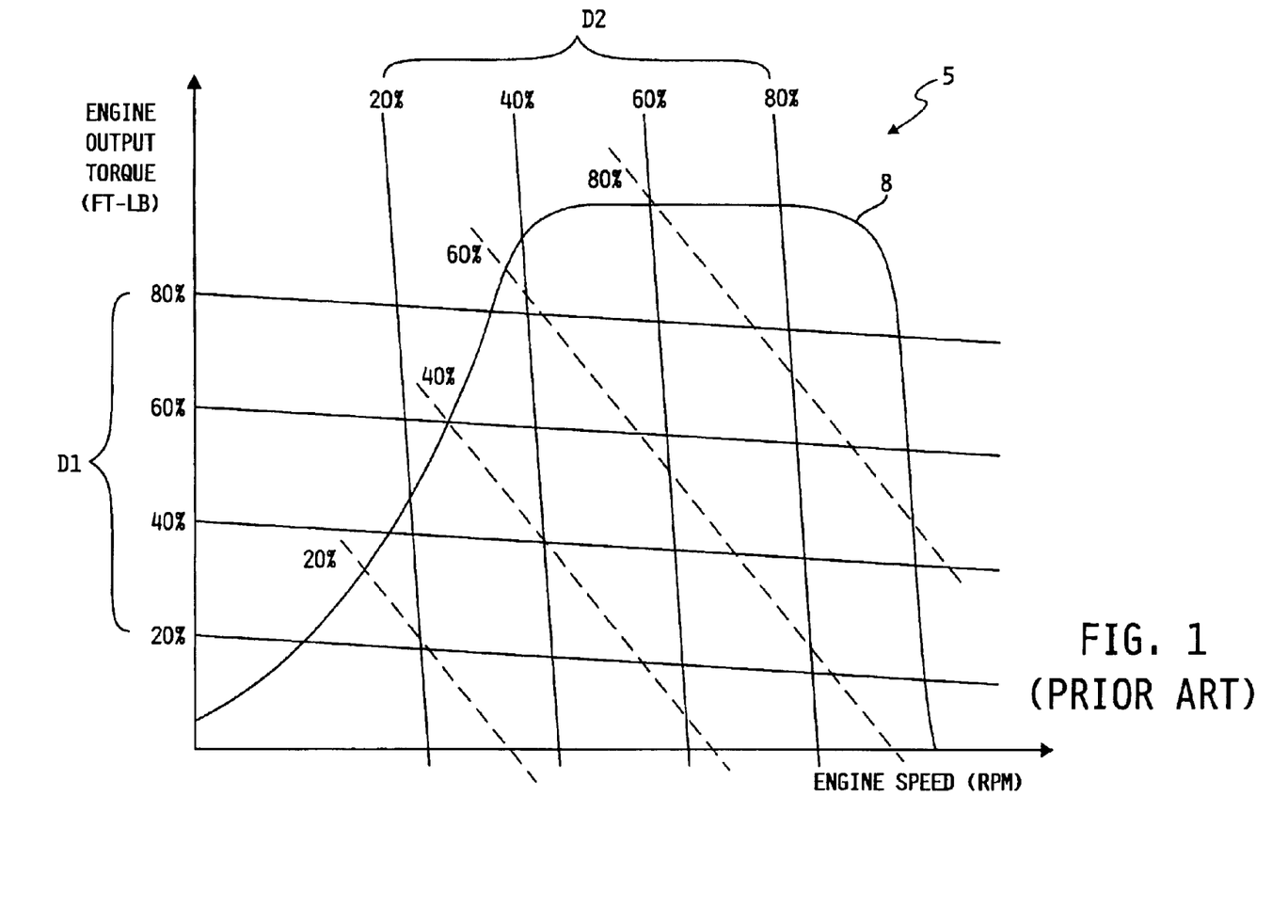
FIG. 1 is a plot of engine output torque vs. engine speed having a number of known fueling governor droop strategies superimposed thereon.

Referring to FIG. 1, a plot 5 of engine output torque vs. engine speed is shown illustrating a torque curve 8 for an example heavy-duty diesel engine. The torque curve 8 defines an upper boundary of engine output torque/engine speed behavior, and accordingly represents a 100%, or full-load, fueling condition. In the context of the present invention, the term "engine output torque" will be used interchangeably with the term "fueling" such that 50% engine output torque is equivalent to 50% fueling, 100% engine output torque (corresponding to torque curve 8) is equivalent to 100%, or full-load fueling, etc. However, one caveat to these terms occurs at 0% engine output torque. It is generally understood that the engine may be running while producing no drive torque, and in this case, 0% engine output torque does not actually correspond to 0% fueling. Rather, under such conditions a certain minimum amount of fueling must be supplied to maintain the engine operational, and 0% engine output torque is typically referred to as a "no-load fueling" condition. For purposes of the subject invention, the term "no-load fueling" may thus be used interchangeably with 0% engine output torque.

Superimposed onto plot 5 is a first set of constant throttle values (e.g., 20% throttle, 40% throttle, etc.) identified as D1, wherein D1 represents a first droop value. Droop D1 is indicative of a so-called "min-max", or "automotive", governor defining throttle position as substantially proportional to engine output torque as illustrated in FIG. 1. Min-max governors of this type have heretofore been used in over-the-road truck applications and are generally characterized by flat droop lines as illustrated by D1. Another type of governor is a so-called "variable speed", or "VS", governor defining throttle position as substantially proportional to engine speed as illustrated by droop lines D2 in FIG. 1. VS governors of this type have heretofore been used in industrial machinery applications and are generally characterized by steep droop lines as illustrated by D2. In either case, droop is defined for purposes of the subject invention as an engine speed difference between full-load (torque curve) and no-load fueling (% engine output torque) for any constant throttle position. Thus, min-max governors (D1) have higher droop values as compared with VS governors (D2).

In over-the-road truck applications, it is generally understood that while min-max governors (D1) provide excellent tracking between throttle percentage and engine output torque, and are accordingly well-suited for low vehicle speed and vehicle launch conditions, they are generally ill-suited for smoothly maintaining engine speed during high vehicle speeds, during hilly terrain operation and with heavily loaded vehicles. Min-max governors are accordingly characterized as having optimal low vehicle speed/high transmission gear ratio response, but as having "slow pedal response" under high vehicle speed/low transmission gear ratio conditions. Conversely, while VS governors (D2) are generally understood to provide excellent tracking between throttle percentage and engine speed, and are accordingly well-suited for high vehicle speed, heavily loaded and hilly terrain operation, they are generally ill-suited for smoothly maintaining engine speed during slow vehicle speeds, over rough or bumpy roads and with lightly loaded vehicles. VS governors are accordingly characterized as having undesirably "fast pedal response" under low vehicle speed/high transmission gear ratio conditions, but as having optimal high vehicle speed/low transmission gear ratio response.

Due to the drawbacks associated with the two foregoing governor types, modern over-the-road trucks typically implement a so-called "hybrid" governor, illustrated in FIG. 1 by the dashed-lines of constant throttle percentage. Hybrid governors of this type are characterized by droop lines falling somewhere between the two droop extremes D1 and D2. It is generally understood that hybrid governors attempt, as a design goal, to capture an optimal mix between the min-max governor D1 and the VS governor D2. However, while such hybrid governors have been widely accepted, they do not capture the benefits of true min-max and VS governor behavior under operating conditions wherein such behavior would be desirable.

Another operating parameter associated with an electronic fueling governor that defines the operational behavior thereof is the overall gain of the governor controller. For purposes of the present invention, the overall gain of the governor controller is defined as the responsiveness of the governor to changes in the throttle signal to effectuate corresponding engine speed changes via control of the one or more fueling signals. Such overall controller gain is typically set in order to provide a desired governor responsiveness while also providing for controller stability.

What is needed is a fueling governor control system wherein governor behavior may be dynamically adjusted as a function of one or more engine and/or vehicle operating conditions to provide for VS and min-max governor behavior, and any hybrid governor behavior therebetween, when any such governor behavior is optimal for current engine/vehicle operating conditions.

SUMMARY OF THE INVENTION

The foregoing shortcomings of the prior art are addressed by the present invention. In accordance with one aspect of the present invention, a system for controlling a fueling governor for an internal combustion engine comprises a vehicle speed sensor producing a vehicle speed signal indicative of road speed of a vehicle carrying and internal combustion engine, a fuel system responsive to a fueling signal to supply fuel to said engine, and a control computer including a fueling governor producing said fueling signal as a function of a throttle command and a measured engine speed value, said governor defining an engine speed difference between a first value of said fueling signal corresponding to a no-load fueling condition and a second value of said fueling signal corresponding to a full-load fueling condition for any constant throttle command value, said control computer modifying said engine speed difference as a continual function of said vehicle speed signal. The fueling governor also has at least one gain value associated therewith defining a responsiveness of said governor to changes in said throttle command to effectuate corresponding changes in said measured engine speed value via control of said fueling signal. In an alternate embodiment of the present invention, the control computer is operable to modify said at least one gain value, rather than or in addition to the engine speed difference, as a function of said vehicle speed signal.

In accordance with another aspect of the present invention, a system for controlling a fueling governor for an internal combustion engine comprises means for determining a gear ratio of a transmission coupled to an internal combustion engine and producing a gear ratio value corresponding thereto, a fuel system responsive to a fueling signal to supply fuel to said engine, and a control computer including a fueling governor producing said fueling signal as a function of a throttle command and a measured engine speed value, said governor defining an engine speed difference between a first value of said fueling signal corresponding to a no-load fueling condition and a second value of said fueling signal corresponding to a full-load fueling condition for any constant throttle command value, said control computer modifying said engine speed difference as a function of said gear ratio value. In an alternative embodiment, the control computer is operable to modify at least one gain value of the fueling governor as a function of the gear ratio value rather than or in addition to the engine speed difference.

In accordance with yet another aspect of the present invention, a system for controlling a fueling governor for an internal combustion engine comprises means for determining one of a mass and a weight of a vehicle carrying an internal combustion engine and producing a corresponding mass or weight value, a fuel system responsive to a fueling signal to supply fuel to said engine, and a control computer including a fueling governor producing said fueling signal as a function of a throttle command and a measured engine speed value, said governor defining an engine speed difference between a first value of said fueling signal corresponding to a no-load fueling condition and a second value of said fueling signal corresponding to a full-load fueling condition for any constant throttle command value, said control computer modifying said engine speed difference as a function of said mass or weight value. In an alternative embodiment, the control computer is operable to modify at least one gain value of the fueling governor as a function of the mass or weight value rather than or in addition to the engine speed difference.

In accordance with a further aspect of the present invention, a system for controlling a fueling governor for an internal combustion engine comprises means for determining a condition of a road traveled by a vehicle carrying an internal combustion engine and producing a corresponding road condition signal, a fuel system responsive to a fueling signal to supply fuel to said engine, and a control computer including a fueling governor producing said fueling signal as a function of a throttle command and a measured engine speed value, said governor defining an engine speed difference between a first value of said fueling signal corresponding to a no-load fueling condition and a second value of said fueling signal corresponding to a full-load fueling condition for any constant throttle command value, said control computer modifying said engine speed difference as a function of said road condition signal. In an alternative embodiment, the control computer is operable to modify at least one gain value of the fueling governor as a function of the road condition signal rather than or in addition to the engine speed difference. In either case, the road condition may, in accordance with the present invention, represent a grade of the road, a measure of roughness of the road surface, and/or a combination of the two.

In accordance with yet a further aspect of the present invention, a system for controlling a fueling governor for an internal combustion engine comprises an engine speed sensor producing an engine speed signal indicative of rotational speed of an internal combustion engine, means for producing a throttle command indicative of a fueling request, means for determining an operating condition associated with one of said engine and a vehicle carrying said engine and producing an operating signal corresponding thereto, said operating condition independent of said rotational speed of said engine and said throttle command, a fuel system responsive to a fueling signal to supply fuel to said engine, and a control computer including a fueling governor producing said fueling signal as a function of said throttle command and said engine speed signal, said governor defining an engine speed difference between a first value of said fueling signal corresponding to a no-load fueling condition and a second value of said fueling signal corresponding to a full-load fueling condition for any constant throttle command value, said governor having at least one gain value associated therewith defining a responsiveness of said governor to changes in said throttle command to effectuate corresponding changes in said rotational speed of said engine via control of said fueling signal, said control computer modifying said engine speed difference and said at least one gain value as a function of said operating condition signal.

One object of the present invention is to provide a system for controlling a fueling governor of an internal combustion engine to provide for different governor operating characteristics at different engine or vehicle operating conditions.

Another object of the present invention is to provide a governor control system operable to vary a governor droop value as a function of one or more engine or vehicle operating conditions.

Still another object of the present invention is to provide a governor control system operable to vary at least one governor gain value as a function of one or more engine or vehicle operating conditions.

These and other objects of the present invention will become more apparent from the following description of the preferred embodiment.

DESCRIPTION OF THE PREFERRED EMBODIMENTS

For the purposes of promoting an understanding of the principles of the invention, reference will now be made to a number of preferred embodiments illustrated in the drawings and specific language will be used to describe the same. It will nevertheless be understood that no limitation of the scope of the invention is thereby intended, such alterations and further modifications in the illustrated embodiments, and such further applications of the principles of the invention as illustrated therein being contemplated as would normally occur to one skilled in the art to which the invention relates.

Figure 2:
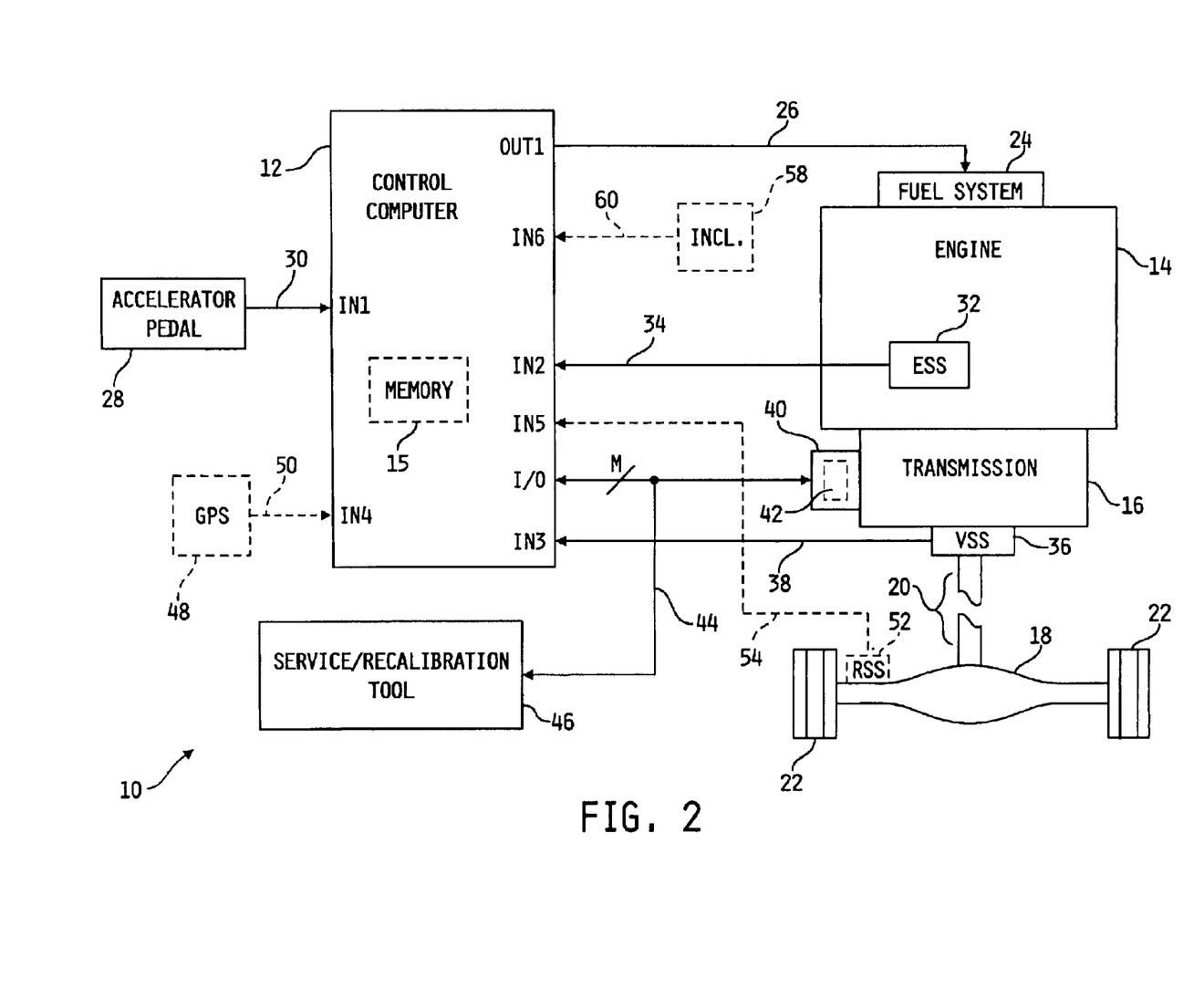
FIG. 2 is a diagrammatic illustration of one preferred embodiment of a system for controlling a fueling governor for an internal combustion engine, in accordance with the present invention.

Referring now to FIG. 2, one preferred embodiment of a system 10 for controlling a fueling governor for an internal combustion engine, in accordance with the present invention, is shown. Central to system 10 is a control computer 12 that is preferably microprocessor-based and includes a memory unit 15, a number of digital inputs/outputs and a number of analog-to-digital (A/D) inputs/outputs. Control computer 12 is configured to execute a number of software algorithms, and is generally operable to control and manage the overall operation of an internal combustion engine 14. In this regard, control computer 12 is typically referred to as an electronic or engine control module or unit (ECM or ECU), although it is to be understood that control computer 12 may alternatively be any control circuit configured to operate as described herein. In any case, the memory unit 15 of control computer 12 may include RAM, ROM, EPROM, EEPROM, FLASH memory and/or any other memory known to those skilled in the art.

Internal combustion engine 14 is operatively connected to a transmission 16 that is, in turn, operatively connected to a propeller shaft (or tailshaft) 20. The propeller shaft 20 is operatively connected to an axle 18 that is rotatably coupled to a number of vehicle wheels 22. The engine 14, transmission 16, propeller shaft 20, axle 18 and wheels 22 define a vehicle driveline, drivetrain or powertrain operable to transfer driving force supplied by engine 14 to wheels 22 as is known in the art.

The engine 14 includes a fuel system 24 coupled thereto and electrically connected to output OUT1 of control computer 12 via signal path 26. An accelerator pedal 28 is electrically connected to an input IN1 of control computer 12, and is operable to provide a throttle signal on signal path 30 indicative of accelerator pedal deflection or percentage. Alternatively, device 28 may represent other known mechanisms for producing a signal indicative of an operator request for fuel (or torque), wherein examples of such mechanisms include, but are not limited to, hand-actuated throttle devices, cruise control devices and the like. In any case, device 28 is operable to produce a throttle signal or throttle command value indicative of requested fueling or torque. Control computer 12 is responsive to the throttle signal on signal path 30, as well as to a number of other engine/vehicle operating condition parameters, to determine one or more fueling signals for fueling engine 14 in a manner known in the art, and some of the details of which will be described more fully hereinafter with respect to FIG. 3. Control computer 12 is further operable to provide such one or more fueling signals to fuel system 24 via signal path 26. Fuel system 24 is, in turn, responsive to the one or more fueling signals provided thereto to correspondingly supply fuel to engine 14.

System 10 further includes a number of sensors or sensing systems configured to provide control computer 12 with engine and/or vehicle operating information. For example, engine 14 includes an engine speed sensor 32 electrically connected to an input IN2 of control computer 12 via signal path 34. Sensor 32 is, in one preferred embodiment, a Hall effect sensor operable to sense passage thereby of a number of teeth formed on a gear or tone wheel rotating synchronously with the engine crank shaft, although the present invention contemplates providing engine speed sensor 32 as any known rotational speed sensor including, for example, a variable reluctance sensor or the like. In any case, engine speed sensor 32 is operable to provide control computer 12 with an engine speed signal indicative of engine rotational speed.

System 10 further includes a vehicle speed sensor 36 electrically connected to an input IN3 of control computer 12 via signal path 38. In one preferred embodiment, sensor 36 is disposed about propeller shaft 20 adjacent to transmission 16, although the present invention contemplates locating sensor 36 anywhere along propeller shaft 20. In any case, sensor 36 is preferably a variable reluctance sensor or other known sensor configured to provide control computer with a signal indicative of rotational speed of the propeller shaft 20 from which control computer 12 can compute a corresponding vehicle speed or road speed in accordance with known techniques. Those skilled in the art will recognize that system 10 may alternatively or additionally include other known sensors for determining vehicle speed, wherein examples of such other known sensors include, but are not limited to, wheel speed sensors, axle speed sensors and the like.

Control computer 12 preferably includes an I/O port configured for data communications in accordance with a known communications protocol such as SAE J1587, SAE J1939, CAN, or the like. A communications path 44 is connected to the I/O port of control computer 12 and may include any number, M, of communication lines wherein M may be any positive integer. Communications path 44 is preferably configured for serial communications in accordance with any of the communications protocols described hereinabove, but may alternatively be configured for parallel or other communications in accordance with other known communications protocols.

Transmission 16 may, in some embodiments, include a transmission control module 40. In such embodiments, transmission control module 40 includes a transmission control computer 42 electrically connected to communications path 44 and operable to control operation of at least some of the functions of transmission 16, and electrically connected to communications path 44. Generally, computers 12 and 42 are operable to share engine and/or other vehicle operating information via communications path 44, such as by transmitting and receiving various "datalink" messages in accordance with any of a number of known communications protocols. For example, in embodiments wherein transmission 15 includes control module 40 and transmission control computer 42, computer 42 is operable to transmit to control computer 12 via communications path 44 a message indicative of the currently engaged gear ratio of transmission 16. In any case, system 10 also preferably includes a service/recalibration tool 46 of known construction and connectable to communications path 44, wherein tool 46 may be used to program, provide information to, or extract information from, either of the computers 12 and 42.

Transmission 16 may take the form of any of a number of known embodiments. For example, transmission 16 may be a manual change-gear transmission having a plurality of manually selectable gear ratios. In this case, transmission 16 includes a gear shifting mechanism (not shown) that is mechanically coupled to transmission 16 and is manually actuatable for selecting desired gear ratios of transmission 16 in a manner well known in the art.

Alternatively, transmission 16 may be a so-called manual/automatic or semiautomatic transmission having a number of manually selectable gear ratios and a number of automatically selectable gear ratios. In this embodiment, transmission 16 includes a manual gear shifting mechanism, as described hereinabove, for manually selecting certain gear ratios of transmission 16. The manual gear shifting mechanism in this embodiment typically includes an "automatic" position, and when the automatic position of the gear shifting mechanism is selected the control computer 12 is typically operable to control automatic shifting between the number of automatically selectable gear ratios. Alternatively, transmission 16 may include transmission control module 40 having a transmission control computer 42 programmed to control shifting between the automatically selectable gear ratios in a known manner, and to share appropriate information relating thereto with control computer 12. In any case, the manual/automatic transmission 16 of this embodiment is typically referred to as a "Top-2" transmission typically having a number of manually selectable gear ratios and two automatically selectable gear ratios.

As another example, transmission 16 may be a so-called automated manual transmission having at least one manually selectable gear ratio and a number of automatically selectable gear ratios. In this embodiment, transmission control computer 42 is typically operable to control shifting between the automatically selectable gear ratios of transmission 16, and to share appropriate information relating thereto with control computer 12 via communications path 44. Alternatively, control computer 12 may be configured in this embodiment to control shifting between the automatically selectable gear ratios of transmission 16.

System 10 may optionally include a number of additional devices operable to supply control computer 12 with information relating to the operation of the vehicle carrying engine 14. For example, system 10 may include a global positioning system (GPS) receiver 48 electrically connected to an input IN4 of control computer 12 via signal path 50 as shown in phantom in FIG. 1. In one embodiment, GPS receiver 48 is operable, as is known in the art, to receive radio frequency signals broadcast by a number of earth-orbiting satellites and to provide such signals to control computer 12. Control computer 12 is, in turn, operable to convert the received signals to geographic coordinates corresponding to the geographic location of the GPS receiver 48. Alternatively, the GPS receiver 48 may be operable to convert the received signals to geographic coordinates corresponding to the geographic location of the GPS receiver 48 and to supply such geographic information to control computer 12 via signal path 50.

Additionally, system 10 may include a road surface sensor 52 electrically connected to an input IN5 of control computer 12 via signal path 54 as shown in phantom in FIG. 1. Road surface sensor 52 is generally operable to determine a measure of roughness of the road surface upon which the vehicle carrying engine 12 is traveling and to provide a corresponding road surface signal to control computer 12. In one preferred embodiment, road surface sensor 52 is a known vertical position sensor operable to sense vertical displacement of the vehicle axle 18 relative to the vehicle. In this embodiment, the sensor 52 may be mounted to the vehicle axle 18 as shown in FIG. 1 and operable to sense passage thereby of one or more targets affixed to the vehicle. Alternatively, the sensor 52 may be mounted to the vehicle and operable to sense passage thereby of one or more targets affixed to the axle 18. In any case, sensor 52 is operable to provide control computer 12 with a road surface signal indicative of a measure of roughness of the road surface upon which the vehicle is traveling. In an alternative embodiment, memory 15 of control computer 12 may have stored therein map information including geographical coordinates of various roads in the vicinity of the vehicle along with a relative road roughness value corresponding thereto. In this embodiment, control computer 12 is operable to compare current geographical coordinates provided by GPS system 48 with the map information stored in memory 15 and determine a corresponding road roughness value indicative of a measure of roughness of the road surface being traveled. Those skilled in the art will recognize other known techniques and/or mechanisms for determining a measure of roughness of the road surface upon which the vehicle is traveling, and any such other techniques and/or mechanisms are intended to fall within the scope of the present invention.

As another example, system 10 may include an inclinometer 58 electrically connected to input IN6 of control computer 12 via signal path 60 as shown in phantom in FIG. 2. Inclinometer 58 is operable to determine a grade signal indicative of the grade of the road relative to horizontal (e.g., relative to a flat road) and provide the grade signal to control computer 12. Control computer 12 is, in turn, operable to process the grade signal to determine a measure of the road grade relative to horizontal. For example, control computer 12 may be operable to process the grade signal provided by inclinometer 58 and determine therefrom a road grade value in terms of percent incline or decline relative to horizontal. Those skilled in the art will recognize other known techniques for processing the grade signal provided by inclinometer 58 to determine useful road grade information for use with the subject invention, and such other known techniques are intended to fall within the scope of the present invention. In an alternative embodiment, memory 15 of control computer 12 may have stored therein map information including geographical coordinates of various roads in the vicinity of the vehicle along with a road grade values corresponding thereto. In this embodiment, control computer 12 is operable to compare current geographical coordinates provided by GPS system 48 with the map information stored in memory 15 and determine a corresponding road grade value indicative of a measure of the incline or decline of the road being traveled. Those skilled in the art will recognize other known techniques and/or mechanisms for determining a measure of the grade of the road upon which the vehicle is traveling, and any such other techniques and/or mechanisms are intended to fall within the scope of the present invention.

Figure 3:
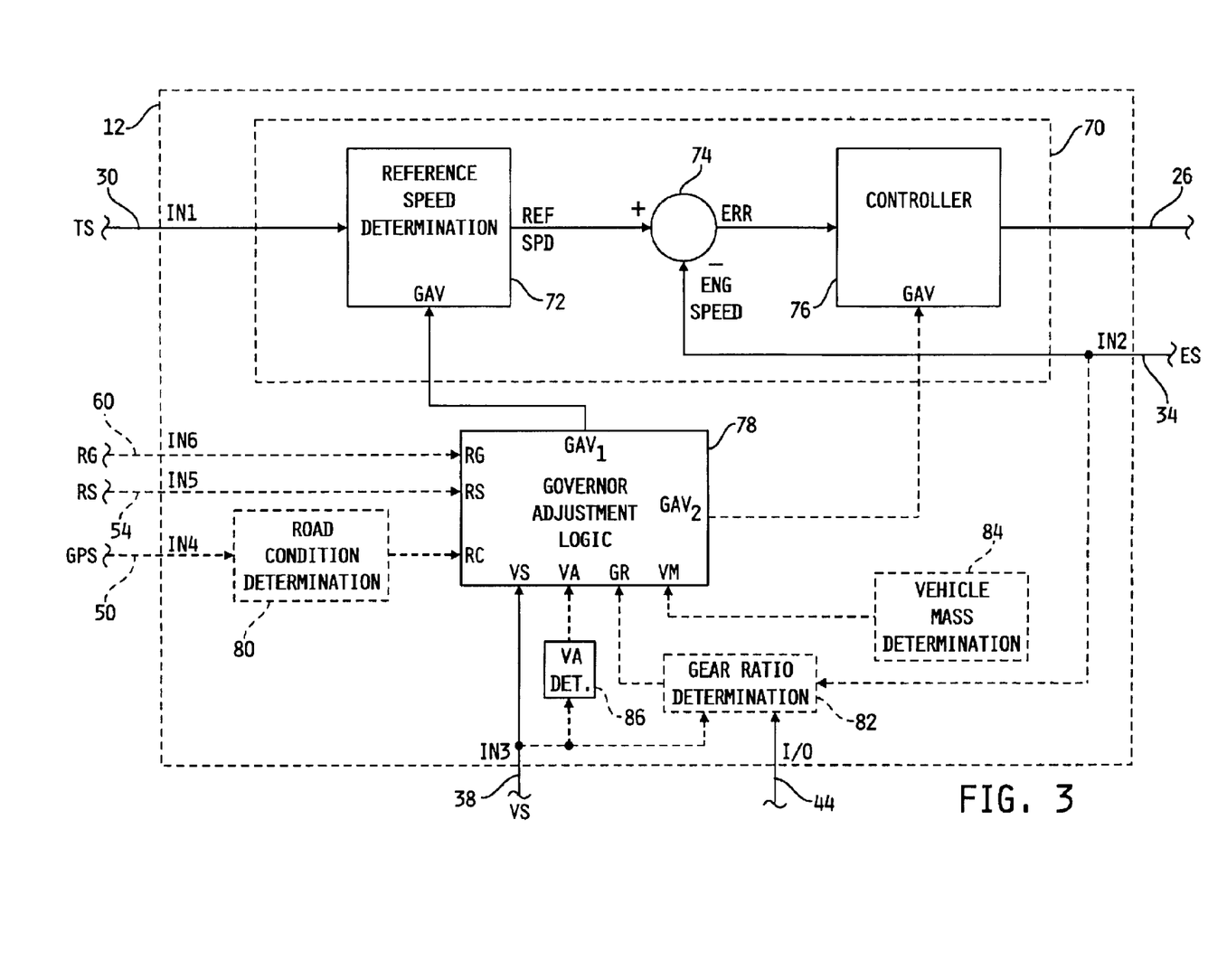
FIG. 3 is a diagrammatic illustration of one preferred embodiment of at least some of the internal structure of the control computer of FIG. 2 as it relates to the present invention.

Referring now to FIG. 3, one preferred embodiment of at least some of the internal structure of control computer 12, as it relates to the present invention, is shown. It is to be understood that the internal structure of control computer 12 illustrated in FIG. 3 does not necessarily represent physical structure but instead represents software structures operable to carry out prescribed control strategies pursuant to one or more software algorithms, some of which will be described in greater detail hereinafter. Those skilled in the art will recognize, however, that the internal structure of control computer 12 illustrated in FIG. 3 could alternatively be implemented in the form of one or more physical control circuits, and such alternate structure is intended to fall within the scope of the present invention. In any case, the structure and function of control computer 12, as it relates to the present invention, will be described hereinafter as being accomplished via software structures.

Control computer 12 includes at least a portion of a conventional fueling governor 70 having a reference speed determination block 72 receiving the throttle signal (TS) via signal path 30 and producing a reference engine speed at an output thereof. Block 72 is operable as described hereinabove in the BACKGROUND section to convert the throttle signal to a reference engine speed (REF SPD) in accordance with any of a variety of known techniques. For example, block 72 may contain a reference speed map in the form of one or more tables, graphs or the like, mapping throttle command values to appropriate reference engine speed values. Alternatively, block 72 may be implemented as one or more known equations relating throttle command values to reference engine speed values. Those skilled in the art will recognize other known strategies for implementing block 72, and any such strategies are intended to fall within the scope of the present invention. In any case, conversion of the throttle command value; e.g., throttle signal TS, to an appropriate reference engine speed value REF SPD includes defines a droop value, wherein droop is defined as a difference in engine speed between a first value of the fueling command or fueling signal corresponding to a no-load fueling condition and a second value of the fueling command or fueling signal corresponding to a full-load fueling condition for any constant throttle command value TS, as described hereinabove in the BACKGROUND section and as is well known in the art.

The reference engine speed value REF SPD is provided to one input of a summation node 74, and a second input to summation node 74 is configured to receive the actual or measured engine speed signal (ENG SPD) provided on signal path 34. In one embodiment, REF SPD is provided to a non-inverting input of node 74 and ENG SPD is provided to an inverting input thereof, although the inputs may be reversed without detracting from the scope of the present invention. In either case, the output of summation node 74 is an error signal ERR corresponding to the difference between REF SPD and ENG SPD. The ERR value is provided as an input to a governor controller 76 configured to compute a fueling command in a manner that minimizes the error value ERR and produce one or more corresponding fueling signals on signal path 26, wherein the fuel system 24 is responsive to the one or more fueling signals to supply fuel to engine 14. Typically, controller 76 is implemented as a known proportional-integral-derivative (PID) controller, wherein each component; i.e., the proportional, integral and derivative components, has a gain value associated therewith that defines a responsiveness of the governor 70 to changes in the throttle command; e.g., throttle signal TS, to effectuate corresponding changes in the measured engine speed value; e.g., ENG SPD, via control of the one or more fueling signals provided on signal path 26.

The structure and function of the fueling governor 76 described thus far is known. In accordance with the present invention, control computer 12 further includes a governor adjustment logic block 78 receiving any of a number of input signals indicative of one or more engine and/or vehicle operating conditions and producing one or more governor adjustment values GAV. In one embodiment, as illustrated in FIG. 3, block 78 includes a vehicle speed input VS receiving the vehicle speed signal provided on signal path 38. Optionally, as shown in phantom in FIG. 3, control computer 12 includes a gear ratio determination block 82 providing a gear ratio value indicative of a currently engaged gear ratio of transmission 16 to a gear ratio input GR of the governor adjustment logic block 78. In embodiments wherein transmission 16 includes a transmission control module 40 and transmission control computer 42, the gear ratio determination block 82 preferably receives gear ratio information from the transmission control computer 42 via communications path 44. Alternatively, and in cases where transmission 16 does not include a transmission control module 40 and transmission control computer 42, gear ratio determination block 82 receives the engine speed signal on signal path 34 and the vehicle speed signal on signal path 38, and computes a gear ratio value as a ratio of engine speed and vehicle speed as is known in the art. In either case, gear ratio determination block 82 is operable to provide a gear ratio value to the gear ratio input GR of governor adjustment logic block 78.

Control computer 12 may also optionally include a vehicle mass or weight determination block 84, as shown in phantom in FIG. 3, wherein block 84 is operable to provide a vehicle mass or weight value, indicative of a current mass or weight of the vehicle carrying engine 14, to a vehicle mass or weight input VM of governor adjustment logic block 78. In one embodiment, vehicle mass or weight estimation block 84 includes a known strategy for estimating vehicle mass or weight, wherein an example of one such strategy that may be implemented in block 84 is described in U.S. patent application Ser. No. 09/935,523, entitled SYSTEM AND METHOD FOR ESTIMATING VEHICLE MASS, which is assigned to the assignee of the present invention and the disclosure of which is incorporated herein by reference. Those skilled in the art will recognize that other known vehicle mass or weight estimation strategies may be implemented in block 84, and any such strategies are intended to fall within the scope of the present invention. In an alternative embodiment, block 84 may be implemented as a storage location within memory 15, wherein a current mass or weight of the vehicle may be entered therein via service/recalibration tool 46 or via any other known mechanism for accessing a storage location within memory 15. In this embodiment, block 84 is operable to provide the vehicle mass or weight value stored therein to the VM input of the governor adjustment logic block 78.

Control computer 12 may also optionally include a vehicle acceleration determination block 86, as shown in phantom in FIG. 3, wherein block 86 is configured to provide a vehicle acceleration value, indicative of a current acceleration rate of the vehicle carrying engine 14, to a vehicle acceleration input VA of governor adjustment logic block 78. In one embodiment, vehicle acceleration determination block 86 is configured to receive the vehicle speed signal on signal path 38 and compute the vehicle acceleration value in accordance with well-known equations, although the present invention contemplates implementing other known techniques for determining vehicle acceleration rate, wherein such other known techniques are intended to fall within the scope of the present invention.

Governor adjustment logic block 78 may also optionally include a road grade input RG receiving a road grade signal provided on signal path 60 by inclinometer 58 as shown in phantom in FIG. 3. Additionally, block 78 may optionally include a road surface condition input RS receiving a road surface condition signal provided on signal path 54 by road surface condition sensor 52, also as shown in phantom in FIG. 3. Block 54 may be configured to use independently either of the road grade and road surface condition signals, or may instead use a combination of the signals in accordance with a road condition adjustment strategy as will be described in greater detail hereinafter. Alternatively, or in addition to either of the road grade and road surface condition inputs RG and RS of block 78, control computer 12 may optionally include a road condition determination block 80 receiving GPS information on signal path 50 and providing a road condition signal to a road condition input RC of block 78. In this embodiment, the road condition signal may include information relating to the grade of the road being traveled, the surface condition of the road being traveled; e.g., a measure of road roughness, or a combination of the two.

The governor adjustment logic block 78 is operable to process one or more of the signals and/or values provided at the various inputs thereof and produce one or more governor adjustment values $GAV_N$ corresponding thereto, wherein N is a positive integer, in a manner to be described more fully hereinafter. In one embodiment, governor adjustment logic block 78 is responsive to one or more of the signals and/or values provided at the various inputs thereof to determine a first governor adjustment value $GAV_1$ and provide this value to a governor adjustment value input GAV of the reference speed determination block 72. In this embodiment, the governor adjustment value $GAV_1$ is a droop adjustment value, and the reference speed determination block 72 is configured to adjust its droop value as a function of $GAV_1$ for the purpose of providing dynamic control over the slope of the droop lines between those of a min-max type of governor and a VS type of governor, as will be described in greater detail hereinafter. In an alternate embodiment, as shown in phantom in FIG. 3, the governor adjustment logic block 78 is responsive to one or more of the signals and/or values provided at the various inputs thereof to determine a second governor adjustment value $GAV_2$ and provide this value to a governor adjustment-value input GAV of the governor controller 76. In this embodiment, the governor adjustment value $GAV_2$ is a gain adjustment value, and the governor controller 76 is configured to adjust one or more of the governor gains (i.e., any of the P, I or D gains) as a function of $GAV_2$ for the purpose of adjusting the responsiveness of the governor to changes in the throttle signal TS, as will be described in greater detail hereinafter. In accordance with the subject invention, control computer 12 may be configured to independently provide dynamic adjustment of governor 70 via the droop adjustment value $GAV_1$, via the gain adjustment value $GAV_2$ or via a combination of the two adjustment values $GAV_1$ and $GAV_2$.

Figure 4:
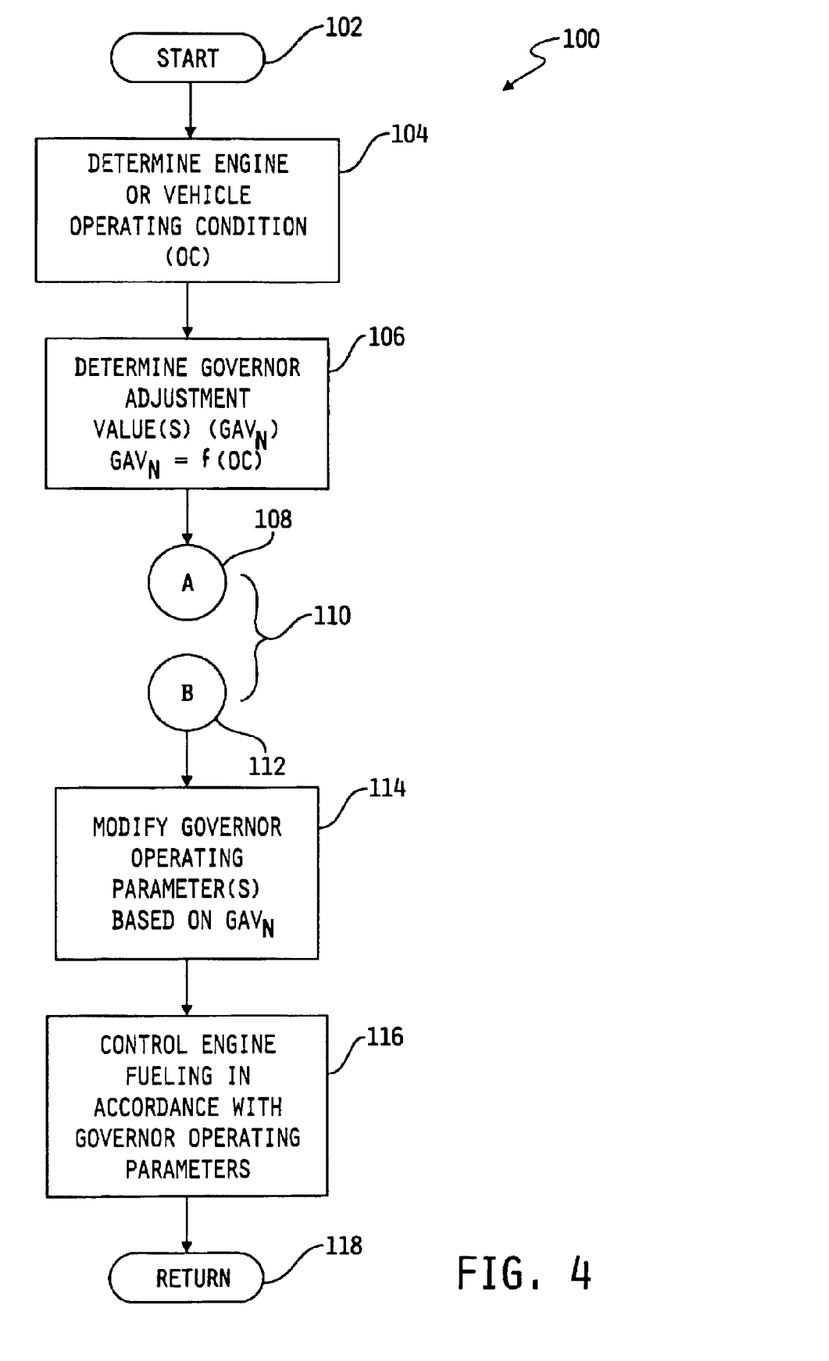
FIG. 4 is a flowchart illustrating one preferred embodiment of a software algorithm for controlling a fueling governor, in accordance with the present invention.

Referring now to FIG. 4, a flowchart is shown illustrating one preferred embodiment of a software algorithm 100 for controlling the operation of the fueling governor 70 of FIG. 3, in accordance with the present invention. In one preferred embodiment, algorithm 100 is stored within memory 15 and repeatedly executed by control computer 12, although the present invention contemplates that algorithm 100 may alternatively be stored elsewhere and be executed by an auxiliary computer such as, for example, transmission control computer 42. In any case, however, algorithm 100 will be described here as being executed by control computer 12.

Execution of algorithm 100 begins at step 102, and at step 104 control computer 12 is operable to determine an engine or vehicle operating condition (OC). The present invention contemplates controlling the operation of the fueling governor 70 of FIG. 3 as a function of any one of a variety of engine or vehicle operating conditions, and examples of specific engine or vehicle operating conditions determined at step 104 will be provided hereinafter. Following step 104, algorithm 100 advances to step 106 where control computer 12 is operable to determine one or more governor adjustment values $GAV_N$ as a function of the operating condition (OC) determined at step 104, wherein N may be any positive integer. Thereafter at step 108, control computer 12 is operable to execute one or more subroutines 110, some examples of which are detailed in FIGS. 5A–5E. Algorithm 100 returns from any one or more such subroutine 110 at step 112, and control computer 12 is operable thereafter at step 114 to modify one or more governor operating parameters based on the one or more governor adjustment values $GAV_N$.

In the embodiment of control computer 12 illustrated in FIG. 3, step 106 is carried out via the governor adjustment logic block 78, wherein N may be one or two. In one preferred embodiment of control computer 12 wherein N=1, the governor adjustment logic block 78 is responsive to the engine or vehicle operating condition OC to produce only governor adjustment value $GAV_1$ as a function thereof, and to supply $GAV_1$ to the reference speed determination block 72 of the fueling governor 70, wherein $GAV_1$ is a droop adjustment value. The reference speed determination block 72, in this embodiment, is then operable to execute step 114 by adjusting the droop value thereof as a function of $GAV_1$. The present invention contemplates that steps 106 and 114 may be carried out in this embodiment in accordance with any of a number of known techniques for adjusting an engine operating parameter. For example, known reference speed determination blocks 72 are typically embodied as a table or chart mapping torque request signals (TS) to appropriate reference speeds as a function of a droop value as illustrated in FIG. 1. In one embodiment of the present invention, the reference speed determination block 72 may be configured to include a number of such tables or charts each having a different droop value, wherein the corresponding droop values preferably range between the two droop value extremes illustrated in FIG. 1; i.e., between the min-max type governor droop value D1 and the VS governor droop value D2. The governor adjustment value $GAV_1$, in this embodiment, may thus be a table or chart selection value based on the engine or vehicle operating condition (OC), wherein the reference speed determination block 72 is responsive to $GAV_1$ to choose an appropriate one of the number of tables or charts that most closely matches the desired droop value.

In an alternate embodiment, the reference speed determination block 72 may be configured to include two tables or charts; one mapping TS to reference speeds as a function of one extreme droop value (e.g., D1) and the other mapping TS to reference speeds as a function of the opposite extreme droop value (e.g., D2). The governor adjustment value $GAV_1$, in this embodiment, may then be a table interpolation value based on the engine or vehicle operating condition OC, wherein the reference speed determination block 72 is responsive to $GAV_1$ to interpolate between the two tables or charts to thereby provide for a desired droop value.

In another alternate embodiment, the reference speed determination block 72 may be implemented as one or more equations relating TS to REF SPD as a function of a droop value. In this embodiment, the governor adjustment value $GAV_1$ may be a weighted mathematical operator (e.g., multiplier, divider, additive or subtractive component) based on the engine or vehicle operating condition OC, wherein the reference speed determination block 72 is responsive to $GAV_1$ to modify its default droop value as a function of the weighted mathematical operator to thereby provide for a desired droop value. Those skilled in the art will recognize other known techniques for implementing a desired droop value in the TS to REF SPD relationship as a function of the engine or vehicle operating condition OC, and such other techniques are intended to fall within the scope of the present invention.

In an alternate embodiment of control computer 12 wherein N=1, the governor adjustment logic block 78 is responsive to the engine or vehicle operating condition OC to produce only governor adjustment value $GAV_2$ as a function thereof, and to supply $GAV_2$ to the controller 76 of the fueling governor 70, wherein $GAV_2$ may comprise one or more gain adjustment values. The controller block 76, in this embodiment, is then operable to execute step 114 by adjusting one or more of the gains associated with controller 76 as a function of $GAV_2$. The present invention contemplates embodiments of controller block 76 that implement any combination of known proportional (P), integral (I) and/or derivative (D) functions, wherein each such function has a gain associated therewith. In such embodiments, $GAV_2$ may include gain adjustment components for each or any of the included P, I and/or D functions. For example, controller block 76 may be implemented as a known PID controller having a first gain value associated with the proportional function, a second gain value associated with the integral function and a third gain value associated with the derivative function. In this example, the gain adjustment value $GAV_2$ may include a gain adjustment component for adjusting the first gain value, a gain component for adjusting the second gain value and/or a gain component for adjusting the third gain value. Alternatively, $GAV_2$ may be configured to adjust only of the first, second and third gain values. In any case, the governor adjustment logic block 78 is operable in this embodiment to determine $GAV_2$ as a function of the engine or vehicle operating condition OC that includes one or more gain adjustment components. The controller block 76 is then operable to modify a corresponding one or more of its gain values as a function of $GAV_2$ to thereby control the responsiveness of the control strategy within controller 76.

The present invention further contemplates embodiments of controller block 76 that implement other known control strategies. Such other control strategies preferably include one or more controller gains associated therewith, and the governor adjustment block 78 is operable in such embodiments to determine $GAV_2$ as a function of the engine or vehicle operating condition OC in a manner that includes one or more controller gain adjustment values. The controller block 76 is, in turn, operable to modify the one or more controller gains to thereby control the responsiveness of the control strategy within controller 76.

In another alternate embodiment of control computer 12, N=2 and the governor adjustment logic block 78 is responsive to the engine or vehicle operating condition OC to produce both of the governor adjustment values $GAV_1$ and $GAV_2$ as a function thereof, and to supply $GAV_1$ to the reference speed determination block 72 and $GAV_2$ to the controller 76 of the fueling governor 70. In this embodiment, the governor adjustment logic block 78 is configured to modify the operation of the fueling governor 70 via adjustment of both of the reference speed determination block 72 and the controller block 76, each as described hereinabove.

Following step 114, algorithm 100 advances to step 116 where control computer 12 is operable to control engine fueling in accordance with the operating parameters of the fueling governor 70 as adjusted by steps 104–114. Algorithm 100 returns thereafter at step 118 to its calling routine. Alternatively, step 116 may loop back to step 104 for continual execution of algorithm 100.

Figures 5A, 5B, 5C, 5D, 5E:
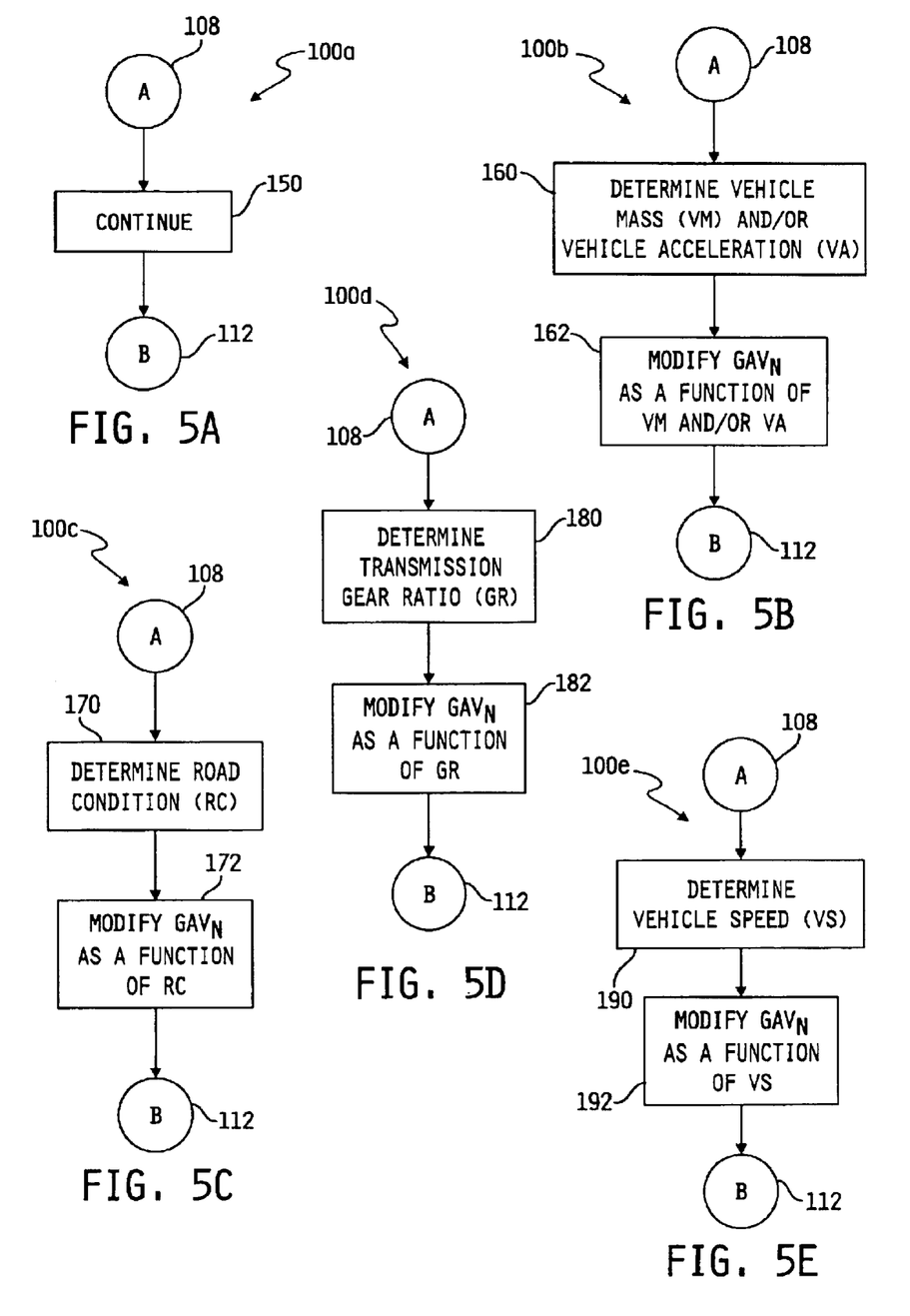
FIG. 5A is a flowchart illustrating one preferred embodiment of an optional software routine for use with the algorithm illustrated in FIG. 4.
FIG. 5B is a flowchart illustrating an alternate embodiment of an optional software routine for use with the algorithm illustrated in FIG. 4.
FIG. 5C is a flowchart illustrating another alternate embodiment of an optional software routine for use with the algorithm illustrated in FIG. 4.
FIG. 5D is a flowchart illustrating yet another alternate embodiment of an optional software routine for use with the algorithm illustrated in FIG. 4.
FIG. 5E is a flowchart illustrating still another alternate embodiment of an optional software routine for use with the algorithm illustrated in FIG. 4.

Referring now to FIG. 5A, a flowchart illustrating one preferred embodiment of a software algrorithm 110*a* for carrying out the subroutine 110 of algorithm 100, in accordance with the present invention, is shown. Algorithm 110*a* advances from step 108 of algorithm 100 to step 150 where control computer 12 simply advances to step 112 of algorithm 100. Algorithm 110*a* thus provides for direct coupling of steps 106 and 114 of algorithm 100 with no further modification of any of the governor adjustment values $GAV_N$.

Referring now to FIG. 5B, a flowchart illustrating an alternate embodiment of a software algorithm 110*b* for carrying out the subroutine 110 of algorithm 100, in accordance with the present invention, is shown. Algorithm 110*b* advances from step 108 of algorithm 100 to step 160 where control computer 12 is operable to determine vehicle mass (VM) and/or vehicle acceleration (VA) via one or more of the techniques described with respect to FIG. 3. Thereafter at step 162, control computer 12 is operable to modify either, or both, of the governor adjustment values $GAV_N$ as a function of VM and/or VA. In the embodiment of control computer 12 illustrated in FIG. 3, step 162 is carried out by the governor adjustment logic block 78, wherein block 78 is operable at step 162 to incorporate into the droop adjustment value ($GAV_1$) and/or the gain adjustment value ($GAV_2$) desired modifications thereto based on vehicle mass/weight and/or vehicle acceleration conditions. Algorithm 110*b* returns from step 162 to step 112 of algorithm 100.

Referring now to FIG. 5C, a flowchart illustrating another alternate embodiment of a software algorithm 110*c* for carrying out the subroutine 110 of algorithm 100, in accordance with the present invention, is shown. Algorithm 110*c* advances from step 108 of algorithm 100 to step 170 where control computer 12 is operable to determine a road condition, RC, corresponding to a current driving condition of the road upon which the vehicle carrying engine 14 is traveling. In one embodiment of algorithm 110*c*, the road condition RC corresponds to a grade of the road, and control computer 12 is operable at step 170 to determine road grade in accordance with any one or more of the techniques described hereinabove with respect to FIG. 3; e.g., via signals provided by GPS system 48 and/or inclinometer 58. In an alternate embodiment of algorithm 110c, the road condition RC corresponds to a measure of roughness of the road, and control computer 12 is operable at step 170 to determine road roughness in accordance with any one or more of the techniques described hereinabove with respect to FIG. 3; e.g., via signals provided by GPS system 48 and/or road surface sensor 52. In another alternative embodiment of algorithm 110c, the road condition RC corresponds to an overall road condition that incorporates therein effects attributable to road grade and road roughness, and control computer 12 is operable at step 170 to determine the road condition as a function of road grade and road roughness information provided thereto via any one or more of the techniques described hereinabove with respect to FIG. 3; e.g., via signals provided by GPS system 48, inclinometer 58 and/or road surface sensor 52. Additionally or alternatively, the present invention contemplates that the road condition, RC, may further include information relating to the density and/or texture of the road surface. For example, in some embodiments it is desirable to include in the road condition determination information relating to whether the road surface is soft; i.e., penetratable or hard, as well as the degree of penetratability, and/or whether or not the road surface is slippery; e.g., wet or icy. In such cases, systems and/or techniques for determining or estimating such information may be conventional and do not themselves form part of the present invention. In any case, control computer 12 is operable thereafter at step 172 to modify either, or both, of the governor adjustment values $GAV_N$ as a function of RC. In the embodiment of control computer 12 illustrated in FIG. 3, step 172 is carried out by the governor adjustment logic block 78, wherein block 78 is operable at step 172 to incorporate into the droop adjustment value ($GAV_1$) and/or the gain adjustment value ($GAV_2$) desired modifications thereto based on road conditions. Algorithm 110c returns from step 172 to step 112 of algorithm 100.

Referring now to FIG. 5D, a flowchart illustrating an alternate embodiment of a software algorithm 110d for carrying out the subroutine 110 of algorithm 100, in accordance with the present invention, is shown. Algorithm 110d advances from step 108 of algorithm 100 to step 180 where control computer 12 is operable to determine a transmission gear ratio (GR) via one or more of the techniques described with respect to FIG. 3. Thereafter at step 182, control computer 12 is operable to modify either, or both, of the governor adjustment values $GAV_N$ as a function of GR. In the embodiment of control computer 12 illustrated in FIG. 3, step 182 is carried out by the governor adjustment logic block 78, wherein block 78 is operable at step 182 to incorporate into the droop adjustment value ($GAV_1$) and/or the gain adjustment value ($GAV_2$) desired modifications thereto based on transmission gear ratio. Algorithm 110d returns from step 182 to step 112 of algorithm 100.

Referring now to FIG. 5E, a flowchart illustrating an alternate embodiment of a software algorithm 110e for carrying out the subroutine 110 of algorithm 100, in accordance with the present invention, is shown. Algorithm 110e advances from step 108 of algorithm 100 to step 190 where control computer 12 is operable to determine vehicle speed (VS) via one or more of the techniques described with respect to FIG. 3. Thereafter at step 192, control computer 12 is operable to modify either, or both, of the governor adjustment values $GAV_N$ as a function of VS. In the embodiment of control computer 12 illustrated in FIG. 3, step 192 is carried out by the governor adjustment logic block 78, wherein block 78 is operable at step 192 to incorporate into the droop adjustment value ($GAV_1$) and/or the gain adjustment value ($GAV_2$) desired modifications thereto based on vehicle speed. Algorithm 110e returns from step 192 to step 112 of algorithm 100.

From the foregoing, it should now be appreciated that the fueling governor control strategy of the present invention is configured to dynamically adjust the operational characteristics of a fueling governor for an internal combustion engine as a function of one or more engine and/or vehicle operating parameters to thereby provide for desired fueling governor operating behavior under various dynamic operating conditions. In this regard, it should be understood that the subroutine 110 executed by the fueling governor control algorithm 100 of FIG. 4 may include any single one, or combination, of any of the various subroutine embodiments illustrated and described with respect to FIGS. 5A–5E. Examples of specific embodiments of algorithm 100 and subroutine 110 are provided below.

EXAMPLE I

In one specific embodiment of algorithm 100, the engine or vehicle operating parameter OC is vehicle speed, wherein control computer 12 is operable at step 104 to determine vehicle speed (VS) in accordance with any of the techniques described hereinabove with respect to FIGS. 2 and 3. In cases where the governor adjustment logic block 78 is configured to produce the droop adjustment value $GAV_1$, steps 106 and 114 are preferably configured such that the resulting modified governor droop value is a continuous function of vehicle speed. In one embodiment, for example, it is desirable for the control computer 12 to modify the governor droop value such that the fueling governor 70 exhibits min-max governor behavior below a first vehicle speed value and exhibits VS governor behavior above a second higher vehicle speed. Between the first and second vehicle speeds, control computer 12 is operable to modify the governor droop value as a continuous function of vehicle speed such that the fueling governor behavior correspondingly varies continuously between min-max and VS governor behavior. In other words, control computer 12 is operable to continuously modify in the reference speed determination block 72 the slope of the engine speed difference between full-load (torque curve) and no-load fueling (% engine output torque) for a constant throttle positions as a function of vehicle speed such that the resulting fueling governor behavior at any instant in time is somewhere between min-max and VS governor behavior.

In cases where the governor adjustment logic block 78 is configured to produce the controller gain adjustment value $GAV_2$, steps 106 and 114 are preferably configured such that the resulting modified controller gain is a continuous function of vehicle speed. In one embodiment, for example, it is desirable for the control computer 12 to modify the controller gain to a minimum gain value below a first vehicle speed value and to a maximum gain value above a second higher vehicle speed. Between the first and second vehicle speeds, control computer 12 is operable to modify the controller gain as a continuous function of vehicle speed such that the controller gain correspondingly varies continuously between minimum and maximum values thereof. Thus, at lower vehicle speeds, the controller 76 is less responsive to changes in the throttle signal (TS) to effectuate corresponding engine speed changes via control of the one or more fueling signals provided on signal path 26, and at higher vehicle speeds the controller 76 is comparatively more responsive to changes in the throttle signal (TS) to effectuate corresponding engine speed changes via control of the one or more fueling signals provided on signal path 26.

In cases where the governor adjustment logic block 78 is configured to produce both $GAV_1$ and $GAV_2$, control computer 12 is operable to control governor droop and controller gain as a continuous function of vehicle speed as just described. Those skilled in the art will recognize that block 78 may be configured such that $GAV_1$ and $GAV_2$ may be weighted such that effects of either are made to dominate over the other as desired.

EXAMPLE II

In another specific embodiment of algorithm 100, the engine or vehicle operating parameter OC is transmission gear ratio, wherein control computer 12 is operable at step 104 to determine transmission gear ratio (GR) in accordance with any of the techniques described hereinabove with respect to FIGS. 2 and 3. In cases where the governor adjustment logic block 78 is configured to produce the droop adjustment value $GAV_1$, steps 106 and 114 are preferably configured such that the resulting modified governor droop value is a function of gear ratio. In one embodiment, for example, it is desirable for the control computer 12 to modify the governor droop value such that the fueling governor 70 exhibits min-max governor behavior while the highest gear ratio or range of gear ratios, corresponding to the numerically lowest transmission gear or range of numerically lowest transmission gears, is engaged, and exhibits VS governor behavior while the lowest gear ratio or range of gear ratios, corresponding to the numerically highest transmission gear or range of numerically highest transmission gears, is engaged. For gear ratios therebetween, control computer 12 is operable to modify the governor droop value as a function of gear ratio or range of gear ratios such that the fueling governor behavior correspondingly varies between min-max and VS governor behavior. In other words, control computer 12 is operable to modify in the reference speed determination block 72 the slope of the engine speed difference between full-load (torque curve) and no-load fueling (% engine output torque) for a constant throttle positions as a function of transmission gear ratio such that the resulting fueling governor behavior at any instant in time is somewhere between min-max and VS governor behavior.

As one specific numerical example, one embodiment of transmission 16 may include 10 selectable gears. For gear ratios corresponding to gears 1–3, for example, control computer 12 may be operable to modify the governor droop value such that the fueling governor 70 exhibits min-max governor behavior. For gear ratios corresponding to gears 9–10, control computer 12 may be operable to modify the governor droop value such that the fueling governor exhibits VS governor behavior, and for gear ratios corresponding to gears 4–8, control computer 12 may be operable to modify the governor droop value such that the fueling governor exhibits governor behavior somewhere between a min-max governor and a VS governor. It should be understood that other gear ratio combinations are contemplated by the present invention, and that the present invention contemplates embodiments wherein control computer 12 is operable to select different droop values for any one or more of the gear ratios of transmission 16.

In cases where the governor adjustment logic block 78 is configured to produce the controller gain adjustment value $GAV_2$, steps 106 and 114 are preferably configured such that the resulting modified controller gain is a function of gear ratio GR. In one embodiment, for example, it is desirable for the control computer 12 to modify the controller gain to a minimum gain value while the highest gear ratio or range of gear ratios, corresponding to the numerically lowest transmission gear or range of numerically lowest transmission gears, is engaged, and to modify the controller gain to a maximum gain value while the lowest gear ratio or range of gear ratios, corresponding to the numerically highest transmission gear or range of numerically highest transmission gears, is engaged. For gear ratios or ranges of gear ratios therebetween control computer 12 is operable to modify the controller gain as a function of gear ratio such that the controller gain correspondingly varies between minimum and maximum values thereof. Thus, for numerically lower transmission gears, the controller 76 is less responsive to changes in the throttle signal (TS) to effectuate correspondingly slower engine speed changes via control of the one or more fueling signals provided on signal path 26, and for numerically higher transmission gears the controller 76 is comparatively more responsive to changes in the throttle signal (TS) to effectuate correspondingly faster engine speed changes via control of the one or more fueling signals provided on signal path 26.

In cases where the governor adjustment logic block 78 is configured to produce both $GAV_1$ and $GAV_2$, control computer 12 is operable to control governor droop and controller gain as a function of transmission gear ratio as just described. Those skilled in the art will recognize that block 78 may be configured such that $GAV_1$ and $GAV_2$ may be weighted such that effects of either are made to dominate over the other as desired.

EXAMPLE III

In another specific embodiment of algorithm 100, the engine or vehicle operating parameter OC is vehicle mass or weight, wherein control computer 12 is operable at step 104 to determine vehicle mass or weight (VM) in accordance with any of the techniques described hereinabove with respect to FIGS. 2 and 3. In cases where the governor adjustment logic block 78 is configured to produce the droop adjustment value $GAV_1$, steps 106 and 114 are preferably configured such that the resulting modified governor droop value is a function of vehicle mass or weight. In one embodiment, for example, it is desirable for the control computer 12 to modify the governor droop value such that the fueling governor 70 exhibits min-max governor behavior for vehicle mass or weight values below a mass or weight threshold, and exhibits VS governor behavior for vehicle mass or weight values above the mass or weight threshold. Alternatively, the control computer 12 may be operable to modify the governor droop value such that the fueling governor 70 exhibits min-max governor behavior for vehicle mass or weight values below a first mass or weight threshold, and exhibits VS governor behavior for vehicle mass or weight values above a second higher mass or weight threshold. Mass or weight values between the first and second mass or weight thresholds, in one embodiment, provides for a mass or weight hysteresis region to avoid rapid switching between min-max and VS governor behavior. Alternatively, for mass or weight values between the first and second mass or weight thresholds, control computer 12 is operable to modify the governor droop value as a function of vehicle mass or weight such that the fueling governor behavior correspondingly varies between min-max and VS governor behavior. In other words, control computer 12 is operable to modify in the reference speed determination block 72 the slope of the engine speed difference between full-load (torque curve) and no-load fueling (% engine output torque) for a constant throttle positions as a function of vehicle mass or weight such that the resulting fueling governor behavior at any instant in time is somewhere between min-max and VS governor behavior.

In cases where the governor adjustment logic block 78 is configured to produce the governor adjustment value $GAV_2$, steps 106 and 114 are preferably configured such that the resulting modified controller gain is a function of vehicle mass or weight VM. In one embodiment, for example, it is desirable for the control computer 12 to modify the controller gain to a minimum gain value when the vehicle mass or weight is below a mass or weight threshold, and to modify the controller gain to a maximum gain value when the vehicle mass or weight is above the mass or weight threshold. Alternatively, control computer 12 may be configured to modify the controller gain to a minimum gain value when the vehicle mass or weight is below a first mass or weight threshold, and to modify the controller gain to a maximum gain value when the vehicle mass or weight is above a second higher mass or weight threshold. Mass or weight values between the first and second mass or weight thresholds, in one embodiment, provides for a mass or weight hysteresis region to avoid rapid switching between minimum and maximum controller gain values. Alternatively, for mass or weight values between the first and second mass or weight thresholds, control computer 12 is operable to modify the controller gain as a function of vehicle mass or weight such that the controller gain correspondingly varies between minimum and maximum values thereof. Thus, for lower vehicle mass or weight values, the controller 76 is less responsive to changes in the throttle signal (TS) to effectuate corresponding engine speed changes via control of the one or more fueling signals provided on signal path 26, and for higher vehicle mass or weight values the controller 76 is comparatively more responsive to changes in the throttle signal (TS) to effectuate corresponding engine speed changes via control of the one or more fueling signals provided on signal path 26.

In cases where the governor adjustment logic block 78 is configured to produce both $GAV_1$ and $GAV_2$, control computer 12 is operable to control governor droop and controller gain as a function of vehicle mass or weight as just described. Those skilled in the art will recognize that block 78 may be configured such that $GAV_1$ and $GAV_2$ may be weighted such that effects of either are made to dominate over the other as desired.

EXAMPLE IV

In another specific embodiment of algorithm 100, the engine or vehicle operating parameter OC is the condition of the road upon which the vehicle carrying engine 14 is traveling, wherein control computer 12 is operable at step 104 to determine road condition (RC) in accordance with any of the techniques described hereinabove with respect to FIGS. 2 and 3. In cases where the governor adjustment logic block 78 is configured to produce the droop adjustment value $GAV_1$, steps 106 and 114 are preferably configured such that the resulting modified governor droop value is a function of road condition. In one embodiment, for example, it is desirable for the control computer 12 to modify the governor droop value such that the fueling governor 70 exhibits VS governor behavior when the road condition signal indicates a road grade greater than a threshold incline value, and exhibits min-max governor behavior when the road condition signal indicates that the road grade is less than the positive incline value. Alternatively, the control computer 12 may be configured to modify the governor droop value such that the fueling governor 70 exhibits VS governor behavior when the road condition signal indicates a road grade greater than a first incline value, exhibits min-max governor behavior when the road condition signal indicates a road grade less than a second lesser incline value, and exhibits governor behavior somewhere between that of a VS and min-max governor when the road condition signal indicates that the road grade is between the first and second incline values.

In another embodiment, it is desirable for the control computer 12 to modify the governor droop value such that the fueling governor 70 exhibits min-max governor behavior when the road condition signal indicates a road surface roughness greater than a threshold measure of roughness, and exhibits VS governor behavior when the road condition signal indicates a road surface roughness less than the threshold measure of roughness. Alternatively, the control computer 12 may be configured to modify the governor droop value such that the fueling governor 70 exhibits min-max governor behavior when the road condition signal indicates a road surface roughness greater than a first measure of roughness, exhibits VS governor behavior when the road condition signal indicates a road surface roughness less than a second lesser measure of roughness, and exhibits governor behavior somewhere between that of a VS and min-max governor when the road condition signal indicates that the road surface roughness is between the first and second measures of roughness.

In still another embodiment, the road condition signal RC is a combination of road grade effects and road surface roughness effects, wherein control computer 12 is preferably operable in this embodiment to process the road roughness indicator in such a manner as to provide for a measure of road surface smoothness. In this embodiment, it is desirable for the control computer 12 to modify the governor droop value such that the fueling governor 70 exhibits min-max governor behavior when the road condition signal indicates a road condition indicative of road surface smoothness/road incline less than a threshold value, and exhibits VS governor behavior when the road condition signal indicates a road condition indicative of road surface smoothness/road incline greater than the threshold value. Alternatively, the control computer 12 may be configured to modify the governor droop value such that the fueling governor 70 exhibits min-max governor behavior when the road condition signal indicates a road condition indicative of road surface smoothness/road incline less than first threshold value, and exhibits VS governor behavior when the road condition signal indicates a road condition indicative of road surface smoothness/road incline greater than a second greater threshold value, and exhibits governor behavior somewhere between that of a VS and min-max governor when the road condition signal indicates that the road surface smoothness/road incline is between the first and second threshold values.

In cases where the governor adjustment logic block 78 is configured to produce the governor adjustment value $GAV_2$, steps 106 and 114 are preferably configured such that the resulting modified controller gain is a function of road condition RC. In one embodiment, for example, it is desirable for the control computer 12 to modify the controller gain to a maximum gain value when the road condition signal indicates a road grade greater than a threshold incline value, and to modify the controller gain to a minimum gain value when the road condition signal indicates that the road grade is less than the positive incline value. Alternatively, the control computer 12 may be configured to modify the controller gain to a maximum value when the road condition signal indicates a road grade greater than a first incline value, to modify the controller gain to a minimum value when the road condition signal indicates a road grade less than a second lesser incline value, and to modify the controller gain to a value between the minimum and maximum values thereof when the road condition signal indicates that the road grade is between the first and second incline values.

In another embodiment, it is desirable for the control computer 12 to modify the controller gain to a minimum gain value when the road condition signal indicates a road surface roughness greater than a threshold measure of roughness, and to modify the controller gain to a maximum gain value when the road condition signal indicates a road surface roughness less than the threshold measure of roughness. Alternatively, the control computer 12 may be configured to modify the controller gain to a minimum gain value when the road condition signal indicates a road surface roughness greater than a first measure of roughness, to modify the controller gain to a maximum gain value when the road condition signal indicates a road surface roughness less than a second lesser measure of roughness, and to modify the controller gain to a value between the minimum and maximum values thereof when the road condition signal indicates that the road surface roughness is between the first and second measures of roughness.

In still another embodiment, the road condition signal RC is a combination of road grade effects and road surface roughness effects, wherein control computer 12 is preferably operable in this embodiment to process the road roughness indicator in such a manner as to provide for a measure of road surface smoothness. In this embodiment, it is desirable for the control computer 12 to modify the controller gain to a minimum gain value when the road condition signal indicates a road condition indicative of road surface smoothness/road incline less than a threshold value, and to modify the controller gain to a maximum gain value when the road condition signal indicates a road condition indicative of road surface smoothness/road incline greater than the threshold value. Alternatively, the control computer 12 may be configured to modify the controller gain to a minimum gain value when the road condition signal indicates a road condition indicative of road surface smoothness/road incline less than first threshold value, to modify the controller gain to a maximum gain value when the road condition signal indicates a road condition indicative of road surface smoothness/road incline greater than a second greater threshold value, and to modify the controller gain to a value between the minimum and maximum values thereof when the road condition signal indicates that the road surface smoothness/road incline is between the first and second threshold values.

In cases where the governor adjustment logic block 78 is configured to produce both $GAV_1$ and $GAV_2$, control computer 12 is operable to control governor droop and controller gain as a function of road condition as just described. Those skilled in the art will recognize that block 78 may be configured such that $GAV_1$ and $GAV_2$ may be weighted such that effects of either are made to dominate over the other as desired.

It is to be understood that in any of the above examples, subroutine 110 of algorithm 100 may include any single one, or appropriate combinations, of algorithms 110a–110e illustrated and described with respect to FIGS. 5A–5D. Thus, in EXAMPLE I, control computer 12 may be configured to modify operation of the fueling governor 70 strictly as a function of vehicle speed as described hereinabove by including in subroutine 110 only algorithm 110a of FIG. 5A. Alternatively or additionally, control computer 12 may further modify $GAV_1$ and/or $GAV_2$ as a function of vehicle mass or weight, vehicle acceleration, road conditions and/or transmission gear ratio as illustrated and described with respect to FIGS. 5B–5D. Likewise, in EXAMPLE II, control computer 12 may be configured to modify operation of the fueling governor 70 strictly as a function of transmission gear ratio as described hereinabove by including in subroutine 110 only algorithm 110a of FIG. 5A. Alternatively or additionally, control computer 12 may further modify $GAV_1$ and/or $GAV_2$ as a function of vehicle mass or weight, vehicle acceleration, road conditions and/or vehicle speed as illustrated and described with respect to FIGS. 5B, 5C and 5E respectively.

Moreover, in EXAMPLE II, control computer 12 may be configured to modify operation of the fueling governor 70 strictly as a function of vehicle mass or weight as described hereinabove by including in subroutine 110 only algorithm 110a of FIG. 5A. Alternatively or additionally, control computer 12 may further modify $GAV_1$ and/or $GAV_2$ as a function of vehicle acceleration, road conditions, transmission gear ratio and/or vehicle speed as illustrated and described with respect to FIGS. 5B–5E. Finally, in EXAMPLE IV, control computer 12 may be configured to modify operation of the fueling governor 70 strictly as a function of the condition of the road upon which the vehicle is traveling as described hereinabove by including in subroutine 110 only algorithm 110a of FIG. 5A. Alternatively or additionally, control computer 12 may further modify $GAV_1$ and/or $GAV_2$ as a function of vehicle mass or weight, vehicle acceleration, transmission gear ratio and/or vehicle speed as illustrated and described with respect to FIGS. 5B, 5D and 5E respectively.

It is to be understood that with respect to the software algorithm 110b illustrated in FIG. 5B, control computer 12 may be configured to additionally or alternatively condition the operation of the fueling governor 70 on vehicle acceleration. In this embodiment, control computer 12 is operable at step 160 to determine vehicle acceleration (VA) in accordance with any of the techniques described hereinabove with respect to FIGS. 2 and 3. In cases where the governor adjustment logic block 78 is configured to produce the droop adjustment value $GAV_1$, steps 106 and 114 of algorithm 100 are preferably configured such that the resulting modified governor droop value is a function of vehicle acceleration. In one embodiment, for example, it is desirable for the control computer 12 to modify the governor droop value such that the fueling governor 70 exhibits min-max governor behavior for vehicle acceleration values above an acceleration threshold, and exhibits VS governor behavior for vehicle acceleration values below the acceleration threshold. Alternatively, the control computer 12 may be operable to modify the governor droop value such that the fueling governor 70 exhibits min-max governor behavior for vehicle acceleration values above a first acceleration threshold, and exhibits VS governor behavior for vehicle acceleration values below a second lower acceleration threshold. Vehicle acceleration values between the first and second acceleration thresholds, in one embodiment, provides for a vehicle acceleration hysteresis region to avoid rapid switching between min-max and VS governor behavior. Alternatively, for vehicle acceleration values between the first and second acceleration thresholds, control computer 12 is operable to modify the governor droop value as a function of vehicle acceleration such that the fueling governor behavior correspondingly varies between min-max and VS governor behavior. In other words, control computer 12 is operable to modify in the reference speed determination block 72 the slope of the engine speed difference between full-load (torque curve) and no-load fueling (% engine output torque) for a constant throttle position as a function of vehicle acceleration such that the resulting fueling governor behavior at any instant in time is somewhere between min-max and VS governor behavior.

In cases where the governor adjustment logic block 78 is configured to produce the governor adjustment value $GAV_2$, steps 106 and 114 are preferably configured such that the resulting modified controller gain is a function of vehicle acceleration VA. In one embodiment, for example, it is desirable for the control computer 12 to modify the controller gain to a minimum gain value when the vehicle acceleration is above an acceleration threshold, and to modify the controller gain to a maximum gain value when the vehicle acceleration is below the acceleration threshold. Alternatively, control computer 12 may be configured to modify the controller gain to a minimum gain value when the vehicle acceleration is above a first acceleration threshold, and to modify the controller gain to a maximum gain value when the vehicle acceleration is below a second lower acceleration threshold. Vehicle acceleration values between the first and second acceleration thresholds, in one embodiment, provides for a vehicle acceleration hysteresis region to avoid rapid switching between minimum and maximum controller gain values. Alternatively, for vehicle acceleration values between the first and second acceleration thresholds, control computer 12 is operable to modify the controller gain as a function of vehicle acceleration such that the controller gain correspondingly varies between minimum and maximum values thereof. Thus, for higher vehicle acceleration values, the controller 76 is less responsive to changes in the throttle signal (TS) to effectuate corresponding engine speed changes via control of the one or more fueling signals provided on signal path 26, and for lower vehicle acceleration values the controller 76 is comparatively more responsive to changes in the throttle signal (TS) to effectuate corresponding engine speed changes via control of the one or more fueling signals provided on signal path 26.

In cases where the governor adjustment logic block 78 is configured to produce both $GAV_1$ and $GAV_2$, control computer 12 is operable to control governor droop and controller gain as a function of vehicle acceleration as just described. Those skilled in the art will recognize that block 78 may be configured such that $GAV_1$ and $GAV_2$ may be weighted such that effects of either are made to dominate over the other as desired.

As an alternative or addition to modifying governor type and/or one or more controller gains as a function strictly of vehicle acceleration, the present invention contemplates modifying governor type and/or one or more controller gains as a function of vehicle acceleration and also as a function of engine fueling commands generated by controller 76. For example, under high fueling and low vehicle acceleration conditions, it is desirable to implement more of a VS type governor and/or increase one or more of the controller gains. Under high fueling, high vehicle acceleration conditions, by contrast, it is desirable to implement more of a min-max type governor and/or decrease one of more of the controller gains. Those skilled in the art will recognize other combinations of relative engine fueling conditions and vehicle acceleration conditions for which it may be desirable to implement more of a VS or min-max type governor and/or increase or decrease one or more of the controller gains, and any other such combinations are intended to fall within the scope of the present invention.

While the invention has been illustrated and described in detail in the foregoing drawings and description, the same is to be considered as illustrative and not restrictive in character, it being understood that only preferred embodiments thereof have been shown and described and that all changes and modifications that come within the spirit of the invention are desired to be protected.

What is claimed is:

1. System for controlling a fueling governor for an internal combustion engine, the system comprising:
    a vehicle speed sensor producing a vehicle speed signal indicative of road speed of a vehicle carrying an internal combustion engine;
    a fuel system responsive to a fueling signal to supply fuel to said engine; and
    a control computer including a fueling governor producing said fueling signal as a function of a throttle command and a measured engine speed value, said governor defining an engine speed difference between a first value of said fueling signal corresponding to a no-load fueling condition and a second value of said fueling signal corresponding to a full-load fueling condition for any constant throttle command value, said control computer modifying said engine speed difference as a continual function of said vehicle speed signal.

2. The system of claim 1 wherein said control computer is operable to increase said engine speed difference as said road speed decreases and to decrease said engine speed difference as said road speed increases.

3. The system of claim 1 further including means for determining a gear ratio of a transmission coupled to said engine and producing a gear ratio value corresponding thereto;
    wherein said control computer is further operable to modify said engine speed difference as a function of said gear ratio signal.

4. The system of claim 1 further including means for determining one of a mass and a weight of said vehicle and producing a corresponding mass or weight value;
    and wherein said control computer is operable to modify said engine speed difference as a function of said mass or weight value.

5. The system of claim 1 wherein said control computer is operable to determine a vehicle acceleration value as a function of said vehicle speed signal;
    and wherein said control computer is operable to modify said engine speed difference as a function of said vehicle acceleration value.

6. The system of claim 1 further including means for determining a condition of a road traveled by said vehicle and producing a road condition signal corresponding thereto;
    wherein said control computer is operable to modify said engine speed difference as a function of said road condition signal.

7. The system of claim 6 wherein said condition of a road traveled by said vehicle corresponds to a grade of said road, said road condition signal corresponding to a road grade signal.

8. The system of claim 6 wherein said condition of a road traveled by said vehicle corresponds to a surface condition of said road, said road condition signal corresponding to a road surface condition signal.

9. The system of claim 1 further including an engine speed sensor producing an engine speed signal indicative of a rotational speed of said engine, said control computer processing said engine speed signal to determine said measured engine speed value.

10. The system of claim 9 further including means for producing said throttle command, said throttle command corresponding to a fueling request.

11. System for controlling a fueling governor for an internal combustion engine, the system comprising:
- a vehicle speed sensor producing a vehicle speed signal indicative of road speed of a vehicle carrying an internal combustion engine;
- a fuel system responsive to a fueling signal to supply fuel to said engine; and
- a control computer including a fueling governor producing said fueling signal as a function of a throttle command and a measured engine speed value, said governor having at least one gain value associated therewith defining a responsiveness of said governor to changes in said throttle command to effectuate corresponding changes in said measured engine speed value via control of said fueling signal, said control computer modifying said at least one gain value as a continual function of said vehicle speed signal.

12. The system of claim 11 wherein said control computer is operable to modify said at least one gain value to increase said responsiveness of said governor as said road speed increases and to modify said at least one gain value to decrease said responsiveness of said governor as said road speed decreases.

13. The system of claim 11 further including means for determining a gear ratio of a transmission coupled to said engine and producing a gear ratio value corresponding thereto;
- wherein said control computer is further operable to modify said at least one gain value as a function of said gear ratio signal.

14. The system of claim 11 further including means for determining one of a mass and a weight of said vehicle and producing a corresponding mass or weight value;
- and wherein said control computer is operable to modify said at least one gain value as a function of said mass or weight value.

15. The system of claim 11 wherein said control computer is operable to determine a vehicle acceleration value as a function of said vehicle speed signal;
- and wherein said control computer is operable to modify said at least one gain value as a function of said vehicle acceleration value.

16. The system of claim 11 further including means for determining a condition of a road traveled by said vehicle and producing a road condition signal corresponding thereto;
- wherein said control computer is operable to modify said at least one gain value as a function of said road condition signal.

17. The system of claim 16 wherein said condition of a road traveled by said vehicle corresponds to a grade of said road, said road condition signal corresponding to a road grade signal.

18. The system of claim 16 wherein said condition of a road traveled by said vehicle corresponds to a surface condition of said road, said road condition signal corresponding to a road surface condition signal.

19. The system of claim 11 further including an engine speed sensor producing an engine speed signal indicative of a rotational speed of said engine, said control computer processing said engine speed signal to determine said measured engine speed value.

20. The system of claim 19 further including means for producing said throttle command, said throttle command corresponding to a fueling request.

21. System for controlling a fueling governor for an internal combustion engine, the system comprising:
- an engine speed sensor producing an engine speed signal indicative of rotational speed of an internal combustion engine;
- means for producing a throttle command indicative of a fueling request;
- means for determining an operating condition associated with one of said engine and a vehicle carrying said engine and producing an operating signal corresponding thereto, said operating condition independent of said rotational speed of said engine and said throttle command;
- a fuel system responsive to a fueling signal to supply fuel to said engine; and
- a control computer including a fueling governor producing said fueling signal as a function of said throttle command and said engine speed signal, said governor defining an engine speed difference between a first value of said fueling signal corresponding to a no-load fueling condition and a second value of said fueling signal corresponding to a full-load fueling condition for any constant throttle command value, said governor having at least one gain value associated therewith defining a responsiveness of said governor to changes in said throttle command to effectuate corresponding changes in said rotational speed of said engine via control of said fueling signal, said control computer modifying said engine speed difference and said at least one gain value as a function of said operating condition signal.

* * * * *